(12) United States Patent
Dierking et al.

(10) Patent No.: US 8,629,975 B1
(45) Date of Patent: Jan. 14, 2014

(54) APPARATUS AND METHOD FOR A MULTIPLE APERTURE COHERENT LADAR

(75) Inventors: Matthew P. Dierking, Springfield, OH (US); Bradley D. Duncan, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 605 days.

(21) Appl. No.: 12/858,680

(22) Filed: Aug. 18, 2010

(51) Int. Cl.
*G01C 3/08* (2006.01)

(52) U.S. Cl.
USPC .......................................... 356/4.01; 359/364

(58) Field of Classification Search
USPC ........................................................ 356/4.01
See application file for complete search history.

(56) References Cited

U.S. PATENT DOCUMENTS

| | | | |
|---|---|---|---|
| 4,115,772 A | | 9/1978 | Valdes |
| 5,022,047 A | | 6/1991 | Dixon et al. |
| 5,117,232 A | * | 5/1992 | Cantwell .................. 342/357.77 |
| 6,031,601 A | * | 2/2000 | McCusker et al. ........... 356/5.01 |
| 6,469,778 B2 | * | 10/2002 | Asaka et al. .................. 356/28.5 |
| 6,879,279 B2 | | 4/2005 | Stappaerts |
| 2004/0125835 A1 | | 7/2004 | Halmos |
| 2005/0057654 A1 | | 3/2005 | Byren |
| 2009/0059201 A1 | * | 3/2009 | Willner et al. ................ 356/5.01 |
| 2010/0208231 A1 | * | 8/2010 | Murai .......................... 356/4.01 |

FOREIGN PATENT DOCUMENTS

| EP | 1542036 | 6/2005 |
|---|---|---|
| EP | 2278715 | 1/2011 |

OTHER PUBLICATIONS

Wang, Y., et al, Multi-Static Networked 3D Ladar for Surveillance and Access, (Apr. 27, 2007), Proc. SPIE. 6550, Laser Radar Technology and Applications XII 65500U, 11 pages.*
E. A. Stappaerts et al., "Differential Synthetic Aperture LADAR," UCRL-JRNL-209959 (2005) 7 pages total.
H. Schulze et al., "Chapter 1: Basics of Digital Communications," In Theory and Applications of OFDM and CDMA, John Wiley & Sons, Ltd. (2005) 50 pages total.
Agilent Technologies, "Digital Modulation in Communication Systems—An Introduction," Application Note 1298 (2001) 45 pages total.
J. Kirkhorn, "Introduction to IQ-demodulation of RF-data," (1999) 13 pages total.
Naval Air Systems Command, "Electronic warfare and RADAR systems engineering handbook," (1997) 299 pages total.
J. Meel, "Spread Spectrum (SS)," De Nayer Instituut (1999) 33 pages total.
C. T. Allen, "Interferometric synthetic aperture RADAR," Department of Electrical Engineering and Computer Science and Radar Systems and Remove Sensing Laboratory, University of Kansas (1995) 8 pages total.
T. T. Ha, "Chapter 8: Spread spectrum," and "Chapter 10.7: Pilot tone-aided demodulation of orthogonal covering signal," in Theory and Design of Digital Communication Systems, Cambridge University Press: Cambridge (2011) 51 pages total.
N. Levanon et al., "Chapter 6, Phase-coded pulse," in Radar Signals, John Wiley & Sons, Inc.: Hoboken (2004) 37 pages total.

* cited by examiner

*Primary Examiner* — Isam Alsomiri
*Assistant Examiner* — Vicente Rodriguez
(74) *Attorney, Agent, or Firm* — AFMCLO/JAZ; Chastity Whitaker

(57) ABSTRACT

A multi-function, range-Doppler, synthetic aperture and micro-Doppler, coherent laser radar system having improved spatial resolution and immunity to undesired platform motion utilizing two or more simultaneous, spatially offset transceiver apertures.

23 Claims, 4 Drawing Sheets

APPARATUS AND METHOD FOR A MULTIPLE APERTURE COHERENT LADAR

RIGHTS OF THE GOVERNMENT

The invention described herein may be manufactured and used by or for the Government of the United States for all governmental purposes without the payment of any royalty.

BACKGROUND OF THE INVENTION

Remote sensing coherent ladar (laser radar) imaging systems can provide images at ranges far beyond the useful range of a traditional diffraction limited imaging systems. Coherent ladar relies on phase sensitive measurements to resolve an object and provide information about its motion. To overcome the diffraction limitations of a finite aperture system, synthetic aperture ladar (SAL) systems use multiple spatial samples from a single small aperture in motion to synthesize a larger effective aperture. This results in higher spatial resolution, but only in the along-track dimension (i.e., in the direction of flight) in which the samples were collected. Conventional SAL imaging has been demonstrated both in the laboratory as well as in flight, but is sensitive to undesired platform motions.

Apertures separated in the cross-track dimension (i.e., the direction perpendicular to both the range and direction of flight) can be used to implement support interferometric SAL (IFSAL). IFSAL can provide enhanced cross-track resolution and can be implemented in the along-track dimension to provide differential SAL (DSAL) that is substantially insensitive to platform motion.

Interferometric synthetic aperture radar (IFSAR) is a frequently used technique developed to realize enhanced resolution in the cross-track, or vertical, dimension. IFSAR utilizes the phase between each resolution cell of two synthetic aperture images collected from two closely spaced apertures to make an estimate of the cross-track position, or height, of an object. Implementing IFSAR techniques at optical wavelengths is extremely challenging and can be impacted by phase variations from a variety of sources, including variations between the two apertures, target and atmospheric de-correlation, and target motion.

Synthetic aperture ladar is extremely sensitive to uncompensated motion due to the short wavelength of the transmit laser. Along-track Differential SAL (DSAL) has been proposed as a way to produce SAL images that are immune to both platform translation and vibration. A CDMA multi-aperture ladar can implement DSAL using a single transmit and receive channel and slightly modified image formation processing. In DSAL, two apertures are separated in the along-track direction.

Range-Doppler and Micro-Doppler imaging detects and characterizes the macro-translational velocity and micro-velocity of a target. Use of multiple transceiver apertures can help to isolate and characterize these motions.

SUMMARY OF THE INVENTION

The present invention relates to an apparatus and method for multiple aperture coherent ladar using periodic pseudo noise (PPN) waveforms and code division multiple access (CDMA) transmission and reception. Improved spatial resolution and immunity to undesired platform motion utilizing two or more simultaneous, spatially offset transceiver apertures is provided. In addition, implementation of the apertures with minimal increase in transmitter or processing complexity can be achieved. The invention will support multiple types of imaging systems, including synthetic aperture imaging, interferometric synthetic aperture imaging, differential synthetic aperture imaging, range-Doppler imaging, and micro-Doppler imaging.

A multi-function, synthetic aperture coherent ladar system having improved spatial resolution and immunity to undesired platform motion utilizing two or more simultaneous, spatially offset transceiver apertures is described.

The use of CDMA transmission and reception to enable multiple apertures coherent laser radar can provide a coherent ladar having multiple, simultaneous apertures. The phase of each aperture of the multiple aperture ladar system can be detected, monitored, and related to the phase of the other apertures within the multiple aperture ladar system. Phase, consequently, can be measured to a fraction of a wavelength between each aperture transmit/receive combination. Cross-track height estimation in synthetic aperture ladar can also be accomplished. When the ladar apertures are oriented in the cross-track dimension, the multi-aperture phase retrieval required for interferometric synthetic aperture ladar height estimate can be provided.

The present invention can also provide synthetic aperture imaging, which is substantially immune to undesired radial platform motions. When the ladar apertures are oriented in the along-track dimension, the invention enables the multi-aperture phase retrieval required for differential synthetic aperture ladar (DSAL). Multiple apertures within the along-track dimension reduce conventional synthetic aperture imaging times, or baseline motion, when the multiple apertures are oriented in the along-track dimension. System complexity can be reduced and can be implemented with relatively simple robust modulators. Implementation can be accomplished with multiple transmitters or using an optical delay for code generation.

The use of an optical delay to transmit, detect, and process PPN waveforms in CDMA ladar can reduce the complexity of multi-aperture coherent ladar hardware. A single laser and modulator can be used to produce orthogonal signals transmitted from each aperture. Phase measurement accuracy can be improved since exact waveform copies are transmitted with delay from each aperture. Also improved is the accuracy of phase measurement since all signals received from all transmit apertures are processed on a single receiver. The use of CDMA reduces hardware complexity since a single receiver channel is used to detect the signal from multiple apertures. The use of CDMA reduces the signal processing load since a single matched filter operation produces the output for all transmit paths received by an aperture.

The use of continuous wave PPN waveforms in coherent ladar provides a high duty cycle waveform and increases performance by pseudo noise waveform. Because of its binary phase, a PPN waveform is a high time bandwidth waveform enabling multiple imaging modes by simply changing post processing algorithms. The waveform allows adaptable Doppler sensitivity by selectively processing different sub-code lengths. The PPN waveform also allows adaptable energy usage by selectively processing long waveform sequences at long ranges to increase the energy per measurement and short sequences at short range to increase imaging rates. This allows high resolution imaging to be maintained over a wide range of operating conditions as well as increasing areas rates at shorter ranges.

According to one aspect of the present invention, there is provided a multi-function, synthetic aperture coherent laser radar system, having improved spatial resolution and immunity to undesired platform motion, to provide an image of a target. The laser radar system includes a first transceiver aperture and a second transceiver aperture, spatially offset from the first transceiver aperture. A signal generator is adapted to generate a multiple sub-code PPN waveform. The signal generator can be coupled to the first transceiver. An orthogonalization device can be coupled to the signal generator and to the first transceiver. The orthogonalization device provides an orthogonal PPN waveform orthogonal to the generated PPN waveform. A demodulation device, coupled to at least one of the first and second transceiver apertures, demodulates reflected PPN waveforms received from the target. A signal processing unit, coupled to the demodulation device, provides the image of the target.

According to another aspect of the present invention there is provided a method of improving the spatial resolution and immunity to undesired platform motion in a synthetic aperture coherent ladar system. The method includes the steps of generating a first PPN waveform having multiple sub-codes, generating an orthogonal PPN waveform orthogonal to the first PPN waveform, transmitting the first PPN waveform and the orthogonal PPN waveform, respectively, through a first and second aperture to a target, receiving a composite waveform reflected from the target, and demodulating the composite waveform to determine a phase history with spectra indicative of target characteristics.

DETAILED DESCRIPTION

Each of the above described systems of coherent ladar require detailed and accurate measurements of the phase of the individual return signals as well as the phase between the signals being received by the apertures. The present invention includes a method and apparatus to measure the required return phase of signals and the phase between the signals returned by respective apertures using PPN waveforms in a CDMA architecture. The technique uses a multiple sub-code PPN waveform, as shown in Table 1, to phase two or more physical apertures and allows multi-input, multi-output (MIMO) operation.

TABLE 1

Composite binary phase code consisting of $C_{Ncode}$ sequential orthogonal sub-codes.

$C_1$ $C_2$ $C_3$ ... $C_{Ncode}$

Figure 1:
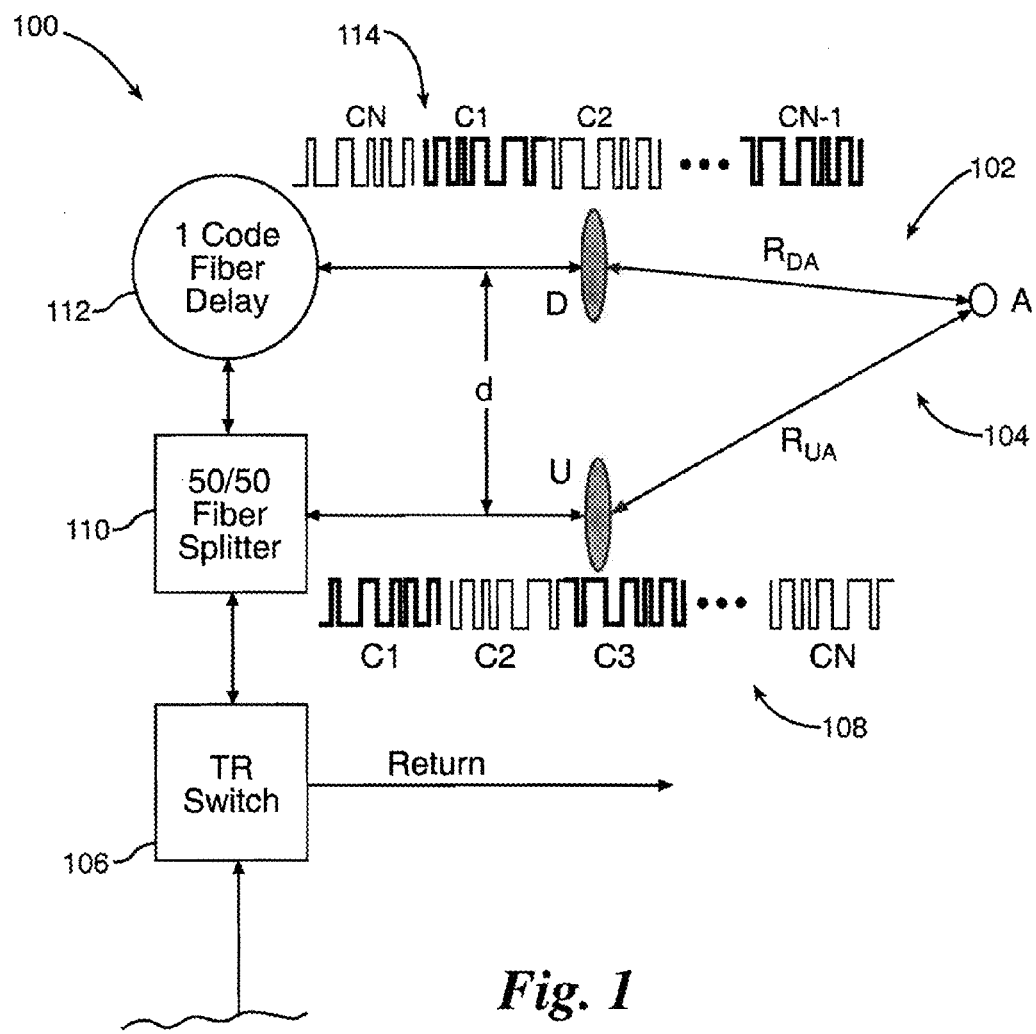
FIG. 1 illustrates a conceptual diagram of use of CDMA transmission and reception via optical delay to enable multiple apertures coherent ladar.

FIG. 1 illustrates one conceptual example of a CDMA implementation in a multiple aperture ladar system 100. By introducing a one sub-code delay between the apertures, orthogonal sub-codes may be transmitted and received from each of the apertures simultaneously, and a multiple-input, multiple-output synthetic aperture ladar based on periodic pseudo noise waveforms with code division multiple access can be achieved. This CDMA implementation allows each receiving aperture to detect and process the codes from all of the transmitting apertures. Because a single transmit waveform and receiver are used, the relative phase between the apertures can be measured and monitored.

To implement the multiple aperture system, the orthogonality of the PPN sub-codes is exploited. As shown if FIG. 1, an outgoing composite code is divided into a first leg 102 and a second leg 104. A Transmit/Receive Switch 106 receives a generated signal (to be described later in more detail), such as signal 108, and transmits the signal to a 50/50 fiber splitter 110. The split signal is transmitted to the second leg 104, which is an un-delayed leg and to an aperture U. The first leg 102 receives the same signal, but the signal is delayed by one sub-code length via a fiber delay line 112. Signal 114 is transmitted along the first leg 102 to an aperture D. Each signal 108 and 114 is transmitted by respective apertures U and D to a target A, where the signals 108, 114 are reflected and return to the apertures U and D.

Upon reflection, both the undelayed signal from aperture U and the delayed signal from aperture D are collected by both apertures U, D resulting in three copies of the signal as shown in Table 2.

TABLE 2

Reflected Signals from Target A

| C1 C2 C3 ... CN | UU |
| CN C1 C2 ... CN-1 | DU |
| C1 C2 C3 ... CN | DD |

In the first path, denoted as UU, the code is transmitted and received from the undelayed aperture U and experiences no delay. In the second path, denoted UD, the code is transmitted and received from either the delayed aperture D or undelayed aperture U and experiences a one sub-code delay. Finally, in the third path, denoted DO, the code is transmitted and received from the delayed aperture D and experiences a two sub-code delay. All paths are recombined at the fiber splitter 110 and processed as a single return signal with delayed components. Applying the matched filter for the undelayed composite code to the multi-aperture return results in three delayed signals notionally shown in Table 3.

TABLE 3

Three Delayed Signals

| UU | UD | DD |

Synthetic aperture imaging is a geometric imaging approach, which localizes targets as a function of range and cross range. Targets are localized in range utilizing high bandwidth waveforms for good range resolution. The cross range localization exploits the phase variation of the signal due to the controlled relative motion between the aperture phase center and the target. For simplicity, it is assumed the aperture moves in a straight line perpendicular to the target.

In interferometric SAL (IFSAL) imaging geometry there are two vertically offset apertures traveling perpendicularly to the target, where $y_A$ is the range to target, d is the aperture separation, $R_{DA}$ and $R_{UA}$ the distances from the undelayed and delayed aperture to the target respectively, and $\lambda$ is the transmitter wavelength.

Figure 2A:
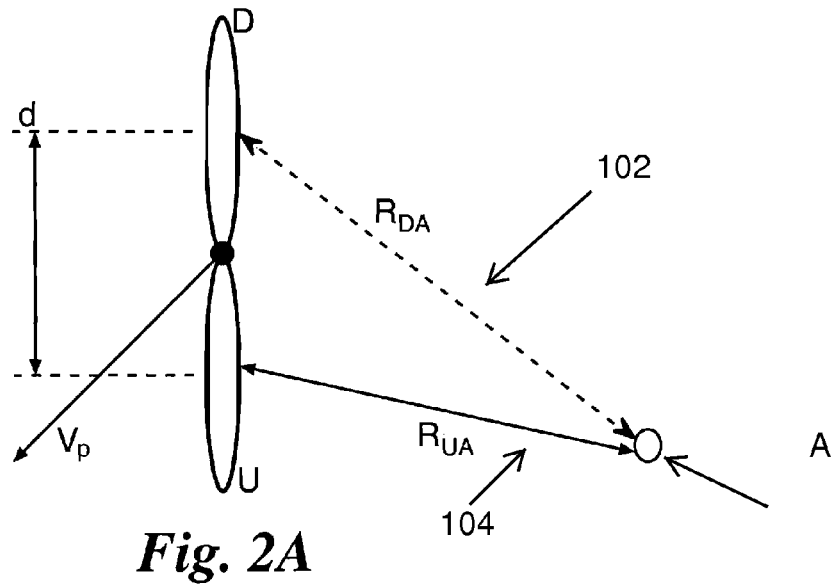
FIGS. 2A and 2B respectively illustrate cross-track and along-track interferometric synthetic aperture ladar.

The two cross-track apertures D, U are shown in FIG. 2A as traveling in direction $V_P$ and having a vertical separation d, which provides three separate paths to the target. The measurements made from the two apertures D, U are the range and phase from each of the apertures to the target A and can be combined to estimate the height of the target $z_A$ (not shown in FIGS. 2A and 2B), and is written as $$z_A = \frac{\lambda y_A}{2\pi d}\left(\frac{2\pi}{\lambda}R_{DA} - \frac{2\pi}{\lambda}R_{UA}\right) = \frac{\lambda y_A}{2\pi d}\Delta\phi.$$

As shown in FIG. 2A, the UU and DD paths measure the round trip path from aperture U and D to the target, denoted as $2R_{UA}$ and $2R_{DA}$, respectively. The third path is similar whether beginning at the un-delayed or delayed aperture (UD or DU) and measures the sum of the path from the un-delayed aperture U to the target A and back to the delayed aperture D and is denoted as $R_{UA}+R_{DA}$. Since the measurements are all based on a single, common waveform and are processed in a single receiver, the phase relationships between each of the paths can be monitored.

Figure 2B:
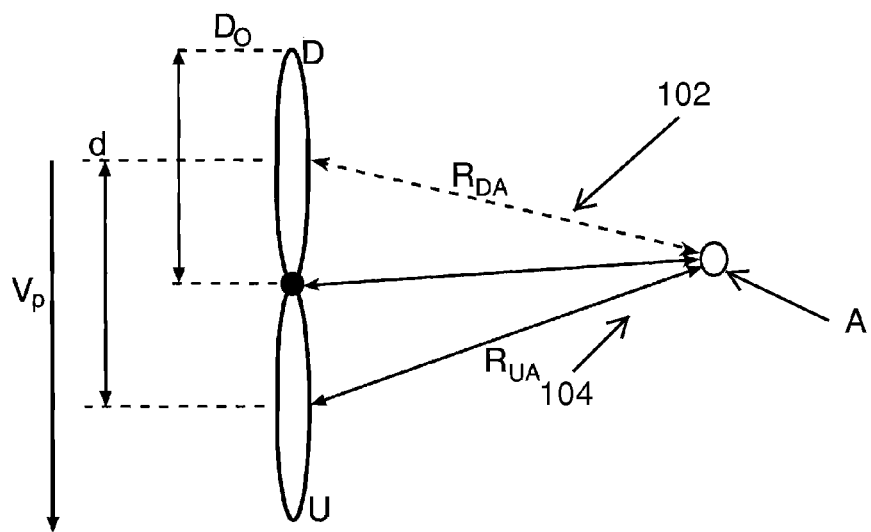

The present invention is also equally applicable to along-track differential SAL. Differential SAL (DSAL) exploits the same PPN/CDMA transceiver construct, but with the apertures aligned in the along-track dimension. The two apertures moving along the same path are used to produce a SAL difference signal that is relatively insensitive to common aperture translation and vibration. It has been shown that the DSAL phase difference can be written as $$\Delta\phi = \exp\left(j\frac{2\pi}{\lambda}d\frac{(x_A - u)}{(y - y_A)}\right),$$

where $x_A$ and $y_A$ are the coordinates of the target, the phase difference is proportional to the range difference $R_{DA}$-$R_{UA}$ between the apertures and the target, d is the aperture separation, and $\lambda$ is the transmitter wavelength. FIG. 2B illustrates a configuration of the along-track DSAL having apertures traveling in direction $V_P$.

Figure 3:
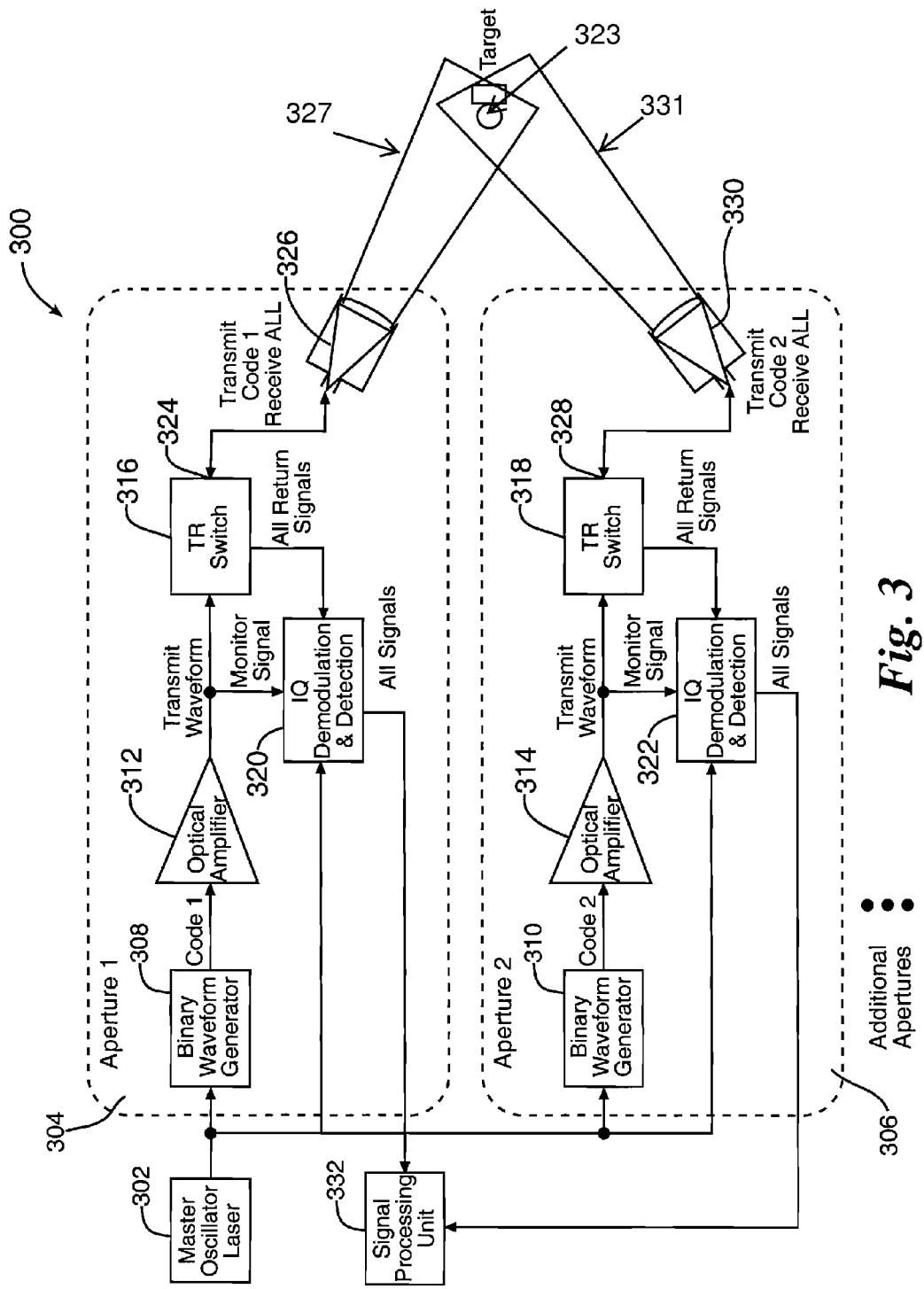
FIG. 3 illustrates a block diagram of one embodiment of a multiple aperture coherent ladar system of the present invention.

FIG. 3 illustrates one embodiment of the present invention in a multiple aperture ladar system 300. A master oscillator laser 302 generates an unmodulated single frequency square wave laser signal having a predetermined frequency. The laser signal is transmitted along a signal line to a first aperture system 304 and a second aperture system 306. The first and second aperture systems 304, 306 include like components but are individually adapted to provide first signal and a second signal delay by one subcode from the first as previously described.

The signal generated by the master oscillator laser 302 is transmitted to a first binary waveform generator 308 and a second binary waveform generator 310. Each of the generators 308, 310 is respectively programmed to modulate the received signal to provide a square wave signal having predetermined pseudo-code with a specified number of chips. In one embodiment the pseudo-code could include twenty thousand chips. The first generated signal, having a code 1, and the second generated signal, having a code 2, are created to be orthogonal with respect to each other. It is also possible to generate completely random signals as long the signal at code 1 and at code 2 are orthogonal with respect to each other.

Each of the signals is transmitted to respective optical amplifiers 312, 314 to provide amplification thereof, as would be understood by one skilled in the art. The outputs of each respective amplifier 312, 314 are respectively coupled to first and second transmit-receive (TR) switches 316, 318 and to respective first and second IQ Demodulator and Detection devices 320, 322. Each of the IQ demodulation and detection devices 320, 322 also receives the original maser oscillator signal generated by master oscillator laser 302. The outputs of respective TR switches 316, 318 are also coupled to the IQ demodulation and detection devices 320, 322.

An input/output interface 324 of TR switch 316 is coupled to aperture 326, which produces a code 1 output beam, 327 for transmission to the target 323. Likewise, an input/output interface 328 of TR switch 318 is coupled to aperture 330, which produces a code 2 output beam 331 for transmission to the target 323. The target 323 reflects the output beams 327, 331, as previously described, back to each of the apertures 326, 330. These reflected signals are transmitted back through respective TR switches 316, 318, IQ demodulation and detection devices 320, and to a signal processing unit 332 for processing. The IQ demodulation and detection devices 320, 322 mix the reflected signals with both the master oscillator laser signal and a copy of the master oscillator laser signal that is delayed by 90 degrees to produce the inphase (I) and quadrature (Q) components of the return signals. The IQ components of the transmitted, or monitor, waveforms are generated in similar fashion. These signals are then detected by photodetectors and digitized to produce the raw phase history data for subsequent processing.

The signal processing unit 332 includes signal processing software to analyze the phase history data. Mode specific algorithms can be applied to the phase history to produce information about the target 323 including its location, speed, or micro-motions. This approach to implementing multiple apertures via CDMA reduces the signal processing load since multiple paths are processed with a single matched filter operation. This single operation can provide phase history data sufficient for traditional range-Doppler, synthetic aperture, and micro-Doppler imaging, but also provides the multiple phase histories needed for interferometric and differential SAL. Once reduced to phase history data, standard signal processing techniques can be applied. Additional apertures can be added by adding additional systems, such as those described for apertures 304, 306.

Key aspects of PPN waveforms in CMDA/MIMO ladar, including PPN waveform generation, optically delayed transmission and reception, CDMA multi-code compression, and multi-aperture phase retrieval, have been demonstrated using a vibrating target rather than a moving aperture. This technique is directly transferable to inverse synthetic aperture ladar (ISAL) and differential synthetic aperture ladar (DSAL) systems, as further illustrated in FIG. 4.

Figure 4:
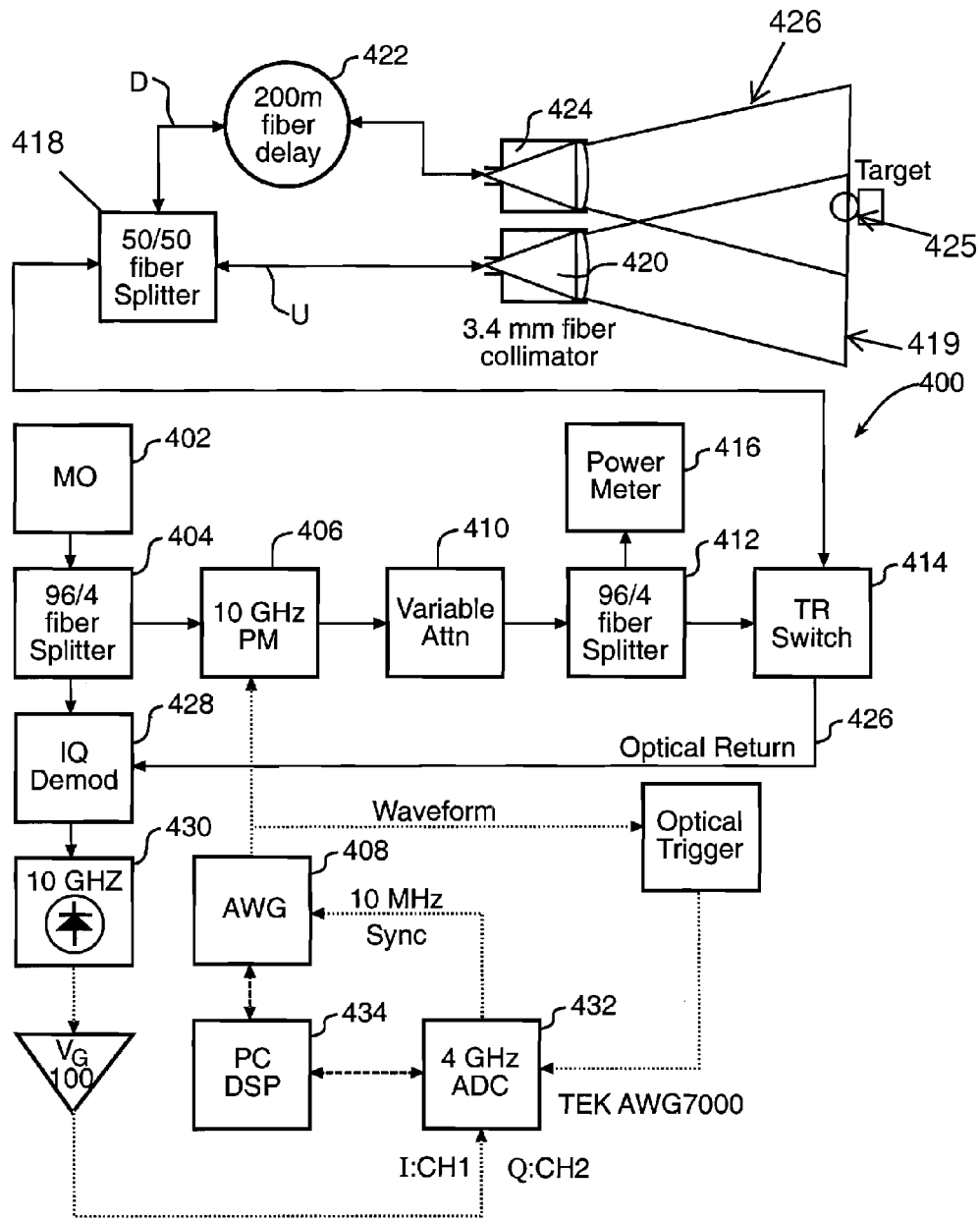
FIG. 4 illustrates a block diagram of another embodiment of a multiple coherent ladar system of the present invention.

FIG. 4 illustrates another embodiment of the present invention ladar system 400 to generate, transmit, detect, and record long sequence PPN waveforms in a MIMO architecture using CMDA encoding. The system 400 includes a fiber delay to provide a phase difference between first and second generated signals and operates at a wavelength of 1.5 micrometers. A stable master oscillator (MO) 402 generates an unmodulated, continuous square wave, such as is available with a Koheras Adjustik laser with nominal spectral line width less than 1 kHz. The Koheras Adjustik laser is available from NKT Photonics, Morganville, N.J. The MO 402 is isolated from the remainder of the system 400 by an Optics for Research fiber isolator (OFR IOT-F-1550) (not shown). The laser output of the MO 402 is split with a 96/4 fiber splitter 404. The high energy leg is coupled to and injected in to a phase modulator (PM) 406. One suitable phase modulator is the PhotLine MPZ-LN-10 10 GHz phase modulator, which is available from Photline Technologies, Besancon, France. The phase modulator 406 was adjusted to condition the 1-volt binary signal from an arbitrary waveform generator (AWG) 408 to produce the $V_\pi$ required to produce a phase shift in the phase modulator 406. The output of the modulator 406 is coupled through a variable attenuator 410 and a 96/4 fiber splitter 412 to a free space transmit/receive (TR) switch 414. A power meter 416 can be coupled to the fiber splitter 412 to monitor the signal power. The output of the TR switch 410 is then split into two legs by a 50/50 fiber splitter 418. The first undelayed leg U is coupled to a transceiver aperture 420, such as a telescope or, more specifically, a fiber collimator, and directed to the target 425. The second leg D is delayed by a single sub-code length using a 200 m polarization maintaining fiber delay 422, before coupling to an identical telescope or collimator 424 directed to the target 425. While transceiver apertures 420, 424 are illustrated, it is within the scope of the present invention to use separate transmitters and receivers.

The length of the fiber $l_{fiber}$ is $$l_{fiber} = \frac{cN_cT_c}{n_{fiber}},$$

where $n_{fiber}$ is the index of refraction of the fiber, $N_c$ is the number of chips in a sub-code, $T_c$ is the chip width, and c is the speed of light. The delay line length is 200 meters for a sub-code with 1000 chips 1 nsec in duration. The delay line length is 200 m for a sub-code with 1000 chips 1 nanosecond in duration. The range resolution of the PPN waveform is proportional to the chip width and, with $T_c$ 1 nsec, is limited to approximately 0.166 m. But since the relative phase between the apertures 420, 424 can now be measured, the relative motion between the apertures 420, 424 and the target 425 can be measured to a fraction of the optical wavelength.

The fiber collimators 420, 424 each produce a 3.4 mm output beam 419, 423 and can be co-aligned by contact mount to a support structure (not shown). The return signals (light) from the target 425 include signals transmitted from both apertures 420, 424. Both signals 419, 423 are collected by both the un-delayed and delayed apertures 420, 424 creating the UU, DD, and UD paths described previously. The signals 419, 423 from the apertures 420, 424 are recombined and passed though the optical return path 426 of the TR switch 414 and mixed with the un-modulated fraction of the MO 402 from the fiber splitter 404 in an IQ demodulator 428 or free space quadrature mixer. The resulting phase modulated signal is detected at baseband on two matched fiber coupled 10 GHz detectors 430. One suitable detector 430 is a PicoSecond-Pulse Laboratory DC-10 GHz detector available from Picosecond Pulse Labs of Boulder, Colo. An arbitrary waveform generator 432 can be used to generate the phased codes to drive the phase modulator 406. One suitable phase modulator 406 is a Tektronix 7052 arbitrary phase modulator, available from Tektronix Inc., Beaverton Oreg. The present invention can be incorporated by using twenty binary PPN sub-codes each with 1000, 1-nanosecond phase chips generated and transmitted continuously from each aperture 420, 424. Both the in-phase and quadrature outputs of the IQ demodulator 428 can be digitized and stored on two channels of a digitizer (not shown) as would be understood by one skilled in the art. One suitable digitizer is an Acqiris 582 digitizer at 4 GS/second, available from Agilent Technologies of Santa Clara, Calif. The resulting waveforms were then transferred to a personal computer for post processing and analysis, as would be understood by one skilled in the art. The multicode-PPN waveform can be generated, optically delayed, and transmitted from two apertures via CDMA, as described in FIG. 4.

While this invention has been described with specific embodiments thereof, alternatives, modifications and variations may be apparent to those skilled in the art. For instance, the present invention can be used with many different types of ladar systems, including those with apertures separated in the cross-track dimension and the along-track dimension. In addition, the present invention is not limited to ladar systems having two apertures, but can include systems having more than two apertures. Such multiple aperture systems include the necessary related circuitry to enable a multiple aperture system as would be understood by one skilled in the art. For instance, when adding additional apertures in the FIG. 4 configuration, each additional aperture would include a delay such that the signal to each additional aperture is delayed by a fiber delay such that the signal is orthogonal to that of an adjacent aperture. Additional fiber splitters can be added to provide the appropriate signals. Accordingly, it is intended to embrace all such alternatives, modifications, and variations that fall within the spirit and broad scope of the appended claims.

What is claimed is:

1. A multi-function coherent ladar system having improved spatial resolution and immunity to undesired platform motion and configured to provide an image of a target, the laser radar system comprising:
    a first transceiver aperture;
    a second transceiver aperture that is spatially offset from the first transceiver aperture;
    a signal generator coupled to the first transceiver aperture and configured to generate a multiple sub-code periodic pseudo-noise waveform and to provide the multiple, sub-code periodic pseudo-noise waveform to the first transceiver aperture for transmission therefrom;
    an orthogonalization device coupled to the signal generator and to the second transceiver aperture, the orthogonalization device configured to provide an orthogonal periodic pseudo-noise waveform to the second transceiver aperture for transmission therefrom and that is orthogonal to the multiple sub-code periodic pseudo-noise waveform;
    a demodulation device coupled to the first and second transceiver apertures and configured to demodulate reflected periodic pseudo-noise waveforms received from the target by the first and second transceiver apertures; and
    a signal processing unit coupled to the demodulation device and configured to generate the image of the target from the reflected periodic pseudo-noise waveforms.

2. The ladar system of claim 1, wherein the orthogonalization device comprises a delay line.

3. The ladar system of claim 2, wherein the delay line comprises a predetermined length selected to delay an orthogonal periodic pseudo-noise waveform one sub-code from the generated periodic pseudo-noise waveform.

4. The ladar system of claim 1, wherein the orthogonalization device comprises a plurality of signal generators, each of the plurality of signal generators configured to generate the orthogonal multiple sub-code periodic pseudo-noise waveform.

5. The ladar system of claim 1, wherein the demodulation device comprises an IQ demodulation and detection device.

6. The ladar system of claim 5, wherein the IQ demodulation and detection device is configured to receive the reflected periodic pseudo-noise waveforms, the reflected periodic pseudo-noise waveforms comprising:
 a first reflected periodic pseudo-noise waveform,
 a second reflected periodic pseudo-noise waveform that is delayed from the first reflected periodic pseudo-noise waveform by a one sub-code delay, and
 a third reflected periodic pseudo-noise waveform that is delayed from the first reflected periodic pseudo-noise waveform by a two sub-code delay.

7. The ladar system of claim 1, wherein the first transceiver aperture and the second transceiver aperture each comprise a telescope.

8. The ladar system of claim 1, further comprising:
 a master oscillator laser coupled to the signal generator and configured to provide a continuous wave laser signal having a spectral line width of less than about 1 kHz.

9. The ladar system of claim 8, wherein the signal processing unit comprises a binary waveform generator, the binary waveform generator including an input coupled to the master oscillator laser and configured to receive the continuous wave laser signal and to generate the multiple sub-code periodic pseudo-noise waveform.

10. The ladar system of claim 1, wherein the first transceiver aperture and the second transceiver aperture are spatially oriented in an along-track dimension.

11. The ladar system of claim 1, wherein the first transceiver aperture and the second transceiver aperture are spatially oriented in a cross-track dimension.

12. The ladar system of claim 1, further comprising:
 a third transceiver aperture spatially offset from the first and second transceiver apertures.

13. A range-Doppler system comprising the ladar system of claim 1.

14. A micro-Doppler system comprising the ladar system of claim 1.

15. A synthetic aperture system comprising the ladar system of claim 1.

16. A method of operating a synthetic aperture coherent ladar system, the method comprising:
 generating a first periodic pseudo-noise waveform having multiple sub-codes;
 generating an orthogonal periodic pseudo-noise waveform that is orthogonal to the first periodic pseudo-noise waveform;
 transmitting the first periodic pseudo-noise waveform and the orthogonal periodic pseudo-noise waveform through first and second transceiver apertures, respectively, to a target;
 receiving a composite waveform reflected from the target by the first and second transceiver apertures; and
 demodulating the composite waveform to determine a phase history with spectra indicative of at least one characteristic of the target.

17. The method of claim 16, further comprising:
 generating an image of the target from the phase history with spectra.

18. The method of claim 17, wherein the composite waveform comprises:
 a first reflected periodic pseudo-noise waveform,
 a second reflected periodic pseudo-noise waveform being delayed from the first reflected periodic pseudo-noise waveform by a one sub-code delay, and
 a third reflected periodic pseudo-noise waveform being delayed from the first reflected periodic pseudo-noise waveform by a two sub-code delay.

19. The method of claim 18, wherein demodulating the composite waveform includes demodulating the first, second, and third reflected periodic pseudo-noise waveforms to determine the phase history with spectra of the received first, second, and third reflected periodic pseudo-noise waveforms.

20. The method of claim 16, wherein generating the orthogonal periodic pseudo-noise waveform further comprises:
 transmitting the first periodic periodic pseudo-noise waveform through a delay line.

21. The method of claim 16, wherein receiving the composite waveform and demodulating the composite waveform are incorporated into a single receive path.

22. The method of claim 16, further comprising:
 transmitting the first periodic pseudo-noise waveform and the orthogonal periodic pseudo-noise waveform through first and second transceiver apertures, respectively, to the target in an along-track dimension.

23. The method of claim 16, further comprising:
 transmitting the first periodic pseudo-noise waveform and the orthogonal periodic pseudo-noise waveform through first and second transceiver apertures, respectively, to a target in a cross-track dimension.

* * * * *